No. 864,295.　　　　　　　　　　　　　　　PATENTED AUG. 27, 1907.
C. T. ENGLUND.
BUGGY THILL CONNECTION.
APPLICATION FILED NOV. 8, 1906.
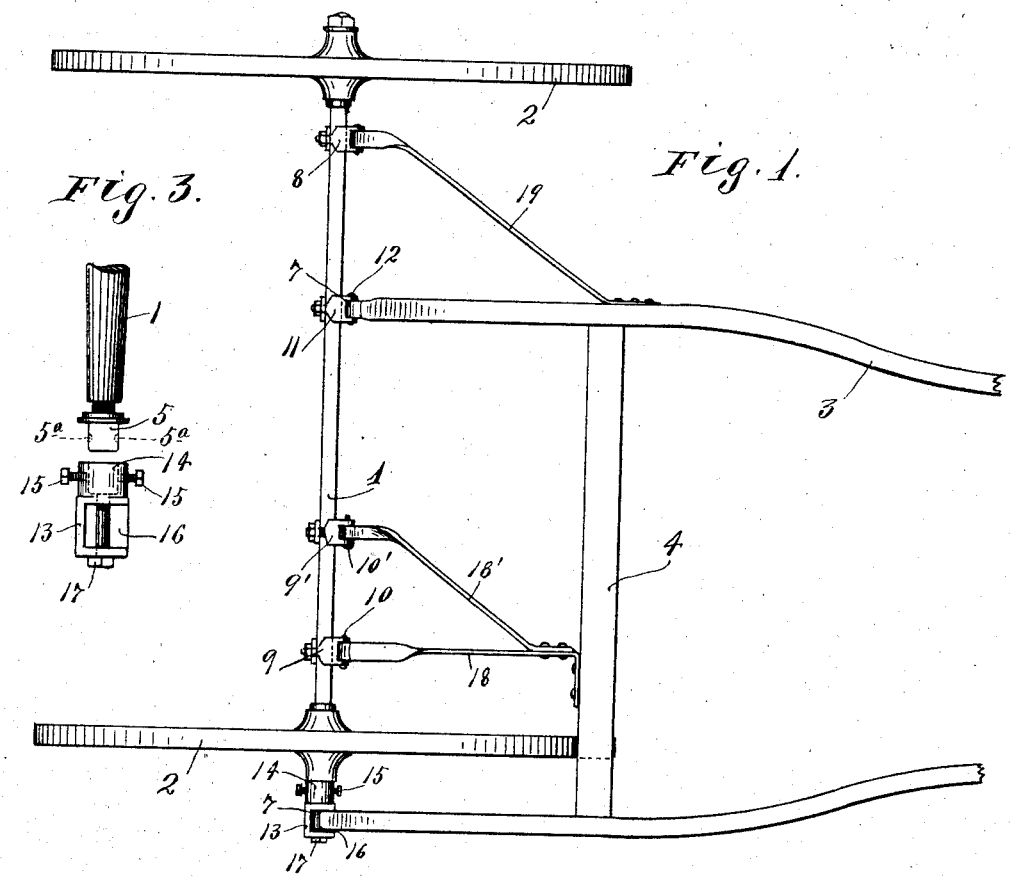
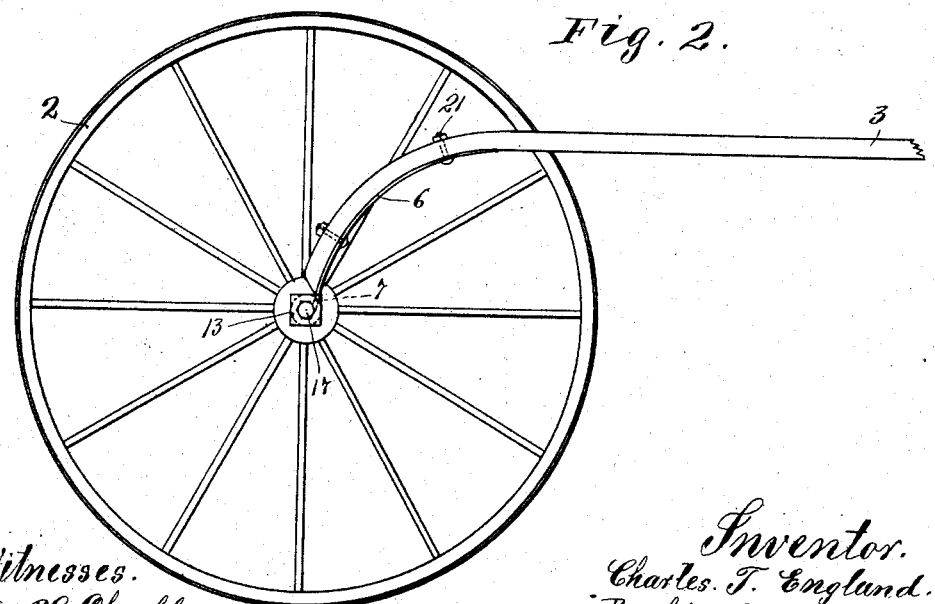
Witnesses.
A. H. Opsahl.
H. D. Kilgore.
Inventor.
Charles T. England.
By his Attorneys.
Williamson & Merchant.
THE NORRIS PETERS CO., WASHINGTON, D. C.

UNITED STATES PATENT OFFICE.

CHARLES T. ENGLUND, OF WHEATON, MINNESOTA.

BUGGY-THILL CONNECTION.

No. 864,295.　　　Specification of Letters Patent.　　　Patented Aug. 27, 1907.

Application filed November 8, 1906. Serial No. 342,508.

*To all whom it may concern:*

Be it known that I, CHARLES T. ENGLUND, a citizen of the United States, residing at Wheaton, in the county of Traverse and State of Minnesota, have invented certain new and useful Improvements in Buggy-Thill Connections; and I do hereby declare the following to be a full, clear, and exact description of the invention, such as will enable others skilled in the art to which it appertains to make and use the same.

My invention relates to buggy thills and to the manner of connecting the same to the front axle of a vehicle.

The invention consists of the novel devices and combinations of devices hereinafter described and defined in the claims.

In the accompanying drawings which illustrate the invention, like characters indicate like parts throughout the several views.

Referring to the drawings, Figure 1 is a plan view showing the front axle and front wheels of a vehicle, and showing a pair of thills connected to the said axle in accordance with my invention. Fig. 2 is a side elevation of the parts shown in Fig. 1; Fig. 3 is a detail showing one end of the axle and a detachable coupling head removed therefrom.

The numeral 1 indicates the front axle, and the numeral 2 the wheels of a buggy or other wheel vehicle.

The numeral 3 indicates a pair of thills, the shafts of which are connected by a cross bar 4. The wheels, as is usual, are secured on the journals of the axle by cap nuts 5. The shafts of the thills are provided with metallic straps 6 of the usual construction having, at their projecting ends, the usual eyes 7. Bolted or otherwise rigidly secured to the axle 1, just inward of the wheels, are coupling brackets 8 and 9 having laterally spaced lugs and bolts or pins 10 passed through said lugs.

The usual manner of connecting the thills to the axle would be to couple the strap eyes 7 directly to the coupling brackets 8 and 9 by means of the bolts 10, and this, as is evident, would bring the thills into such position that the horse would travel in a line half-way between the two wheels. For country roads where deep ruts are worn for the wheels, the horse will always attempt to travel in one of these ruts, and this will cause the wheels to run over the roughest portions of the road, and if the horses be so driven that the wheels run in the ruts, the horse would be caused to travel over the roughest portion of the road.

Hence, in accordance with my invention, I so attach the thills to the axle that the horse may travel in one of the ruts and to one side of the line extending centrally between the wheels. To this end, I provide the axle 1, intermediate of the coupling brackets 8 and, 9 with a third coupling bracket 11 which has laterally spaced lugs, and a coupling bolt 12; and to one of the cap nuts 5 I attach a coupling head 13 which has a socket 14 that is adapted to receive and fit the cap nut 5. Set screws 15, in the inner portion of the head 13, impinge upon the cap nut 5 and preferably engage with depressions 5ª thereof to securely hold the said head 13 in working position. At its outer portion, the coupling head 13 is provided with a recess or pocket 16 which is adapted to receive the eye 7 of the thill strap which is located outside of the adjacent wheel. A bolt 17 having a threaded end is passed loosely through the outer flange of the head 13 and the eye 7 of the said thill strap and is screwed into the inner wall or portion of the said head, thus pivotally connecting the said strap to the outer end of the axle.

Preferably, the cross bar 4 of the thills is provided with a rearwardly projecting metal strap 18 that is pivotally connected to the coupling bracket 9. These two straps 18 and 19 brace the thills against lateral movements. The said straps 18 and 19 should be detachably secured to the thills either by screws or bolts, so that they may be removed when the thills are applied to the axle in the ordinary way.

To add additional lateral rigidity to the thill 3, the strap 18 is provided with a branch strap 18′, connected to a coupling bracket 9′ on the axle 1 by a bolt 10′. If desired, the nut 5 and the socket 14 may be cast or formed integral with each other.

The importance of the device above described will be obvious to all persons who have driven a one horse vehicle over country roads.

What I claim is:

1. The combination with the wheels and front axle of a vehicle, said axle having nuts on its outer ends, of a coupling head detachably secured to one of said axle nuts, and a pair of thills having one shaft pivotally connected to said coupling head, outside of one of the wheels, and having its other shaft pivotally connected to said axle between said wheels, substantially as described.

2. The combination with an axle 1, wheels 2 and nuts 5 applied to the ends of said axle, of a coupling head 13 having a socket 14 fitting one of said nuts 5 and having a pocket 16, of one or more set screws applied to the inner portion of said coupling head and impinging on the cooperating nut 5, a threaded bolt 17 passed through the outer flange of said head 13 and screwed into the hub thereof, coupling brackets 8, 9 and 11 applied to said axle, and a pair of thills having thill straps adapted to be pivotally connected in one instance to said coupling bracket 11 and coupling head 13, and in the other instance to be coupled to said brackets 8 and 9, substantially as described.

In testimony whereof I affix my signature in presence of two witnesses.

CHARLES T. ENGLUND.

Witnesses:
　EDWARD RUSTAD,
　FRED KLAWON.